United States Patent
Leventhal et al.

(10) Patent No.: US 7,720,671 B2
(45) Date of Patent: May 18, 2010

(54) METHOD AND SYSTEM FOR CHILD-PARENT MECHANISM EMULATION VIA A GENERAL INTERFACE

(75) Inventors: Adam H. Leventhal, San Francisco, CA (US); Michael W. Shapiro, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 731 days.

(21) Appl. No.: 11/606,748

(22) Filed: Nov. 30, 2006

(65) Prior Publication Data

US 2008/0133214 A1     Jun. 5, 2008

(51) Int. Cl.
*G06F 9/455* (2006.01)
(52) U.S. Cl. .............. 703/23; 703/26; 703/27; 717/128; 717/134; 717/135
(58) Field of Classification Search .................. 703/23, 703/27; 717/128, 134, 135
See application file for complete search history.

(56) References Cited

U.S. PATENT DOCUMENTS

| | | | |
|---|---|---|---|
| 7,149,900 B2 * | 12/2006 | Rothrock | 713/189 |
| 2004/0025165 A1 * | 2/2004 | Desoli et al. | 719/310 |
| 2005/0071824 A1 * | 3/2005 | K. N. et al. | 717/138 |
| 2007/0168979 A1 * | 7/2007 | Kumar et al. | 717/124 |

OTHER PUBLICATIONS

Douglas Thain et al., "Deploying Complex Applications in Unfriendly Distributed Systems with Parrot", 2004, Kluwer Academic Publishers, pp. 1-20.*
Pradeep Padala, "Playing with ptrace, Part I", 2002, retrieved on Aug. 11, 2009 from www.linuxjournal.com.*
Pradeep Padala, "Playing with ptrace, Part II", 2002, retrieved on Aug. 11, 2009 from www.linuxjournal.com.*
Unknown Author; "Linux/Unix Command: ptrace"; Aug. 10, 2004; 2 pages.
Unknown Author; "ptrace(3C)"; Mar. 22, 2004; 3 pages.
Unknown Author; "proc(1)"; Dec. 3, 2001; 3 pages.

* cited by examiner

*Primary Examiner*—Jason Proctor
(74) *Attorney, Agent, or Firm*—Osha • Liang LLP (57) ABSTRACT

A method for emulating a system call includes making the system call by a first process in a first operating system (OS) for interacting with a second process, wherein the first OS is emulated in a second OS, spawning an agent process, wherein the agent process is a child process of the first process, implementing a functionality of the system call using a general mechanism in the second OS between the agent process and the second process, passing a result associated with the system call from the second process to the agent process using the general mechanism, and relaying the result from the agent process to the first process using a system call in the second OS, wherein the result is stored by the first process.

12 Claims, 6 Drawing Sheets

METHOD AND SYSTEM FOR CHILD-PARENT MECHANISM EMULATION VIA A GENERAL INTERFACE

BACKGROUND

Emulation refers to the ability of a program or device to imitate another program or device. A software emulator allows computer programs to run on a platform (i.e., computer architecture and/or operating system) other than the platform for which the programs were originally written. Emulation attempts to model the state of the device being emulated, as well as reproduce the program's behavior in the emulated device. Emulation software may be packaged for use by computer users, programmers, and manufacturers.

Two common types of emulation are central processing unit (CPU) emulation and operating system (OS) emulation. CPU engineers choose the instruction set that is executed by a given CPU. As a result, a line of CPUs use an instruction set that is generally incompatible with instruction sets used by another line of CPUs. For example, IBM-compatible computers tend to use Intel 80x86-compatible CPUs, such as Intel Pentium™ (Pentium™ is a registered trademark of Intel Corporation) and AMD Athlon™ (Athlon™ is a registered trademark of Advanced Micro Devices, Inc.) CPUs, whereas Macintosh computers originally used Motorola 680x0 CPUs. (Macintosh™ is a registered trademark of Apple Computer, Inc.) CPU emulation software allows a CPU to execute an instruction set that is typically incompatible with that CPU.

Operating Systems (OSes) are collections of instructions that provide a set of routines to the programs running on a computer. OS routines are generally grouped into layers; the lowest layers interact directly with hardware and the higher layers interact with lower layers. OS emulation software allows a computer to provide routines that are not normally provided by the OS installed on the computer. For example, OS emulation software may allow functions from one OS to run on a second OS, even if the second OS does not normally support these functions. OS emulation may also replace some or all of the layers of a given OS.

SUMMARY

In general, in one aspect, the invention relates to a method for emulating a system call, comprising making the system call by a first process in a first operating system (OS) for interacting with a second process, wherein the first OS is emulated in a second OS, spawning an agent process, wherein the agent process is a child process of the first process, implementing a functionality of the system call using a general mechanism in the second OS between the agent process and the second process, passing a result associated with the system call from the second process to the agent process using the general mechanism, and relaying the result from the agent process to the first process using a system call in the second OS, wherein the result is stored by the first process.

In general, in one aspect, the invention relates to a system comprising a first operating system (OS) emulated in a second OS, the second OS, comprising an emulation environment for the first OS, and an emulated userland of the first OS, wherein the emulation environment for the first OS is configured to make a system call by a first process in the first OS for interacting with a second process, spawn an agent process, wherein the agent process is a child process of the first process, implement a functionality of the system call using a general mechanism in the second OS between the agent process and the second process.

In general, in one aspect, the invention relates to a computer readable medium containing software instructions embodied therein for causing a computer system to perform a method for emulating a system call, comprising making the system call by a first process in a first operating system (OS) for interacting with a second process, wherein the first OS is emulated in a second OS, spawning an agent process, wherein the agent process is a child process of the first process, implementing a functionality of the system call using a general mechanism in the second OS between the agent process and the second process, passing a result associated with the system call from the second process to the agent process using the general mechanism, and relaying the result from the agent process to the first process using a system call in the second OS, wherein the result is stored by the first process.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to provide functionality of a first operating system (OS) within a second OS. Further, embodiments of the invention provide a method and system to emulate system calls in the first OS within the second OS, where the system calls in the first OS can be used by any two processes, but where the same system calls in the second OS can only be used within a parent-child process relationship.

Specifically, embodiments of the invention provide a method and system to emulate a ptrace system call from an emulated Linux™ (Linux™ is a registered trademark of William R. Della Croce, Jr.) userland within Solaris™ (Solaris™ is a registered trademark of Sun Microsystems, Inc). Because Solaris only allows ptrace to be used between a parent process and a child process, whereas Linux allows ptrace to be used between two arbitrary processes, the generality of Linux ptrace must be emulated within Solaris when ptrace is used within the emulated Linux userland. In accordance with one or more embodiments of the invention, a general mechanism in Solaris, such as /proc, is used to implement the functionality of Linux ptrace between two arbitrary processes using a third intermediary process, which is created as a child of one of the processes.

Figure 1:
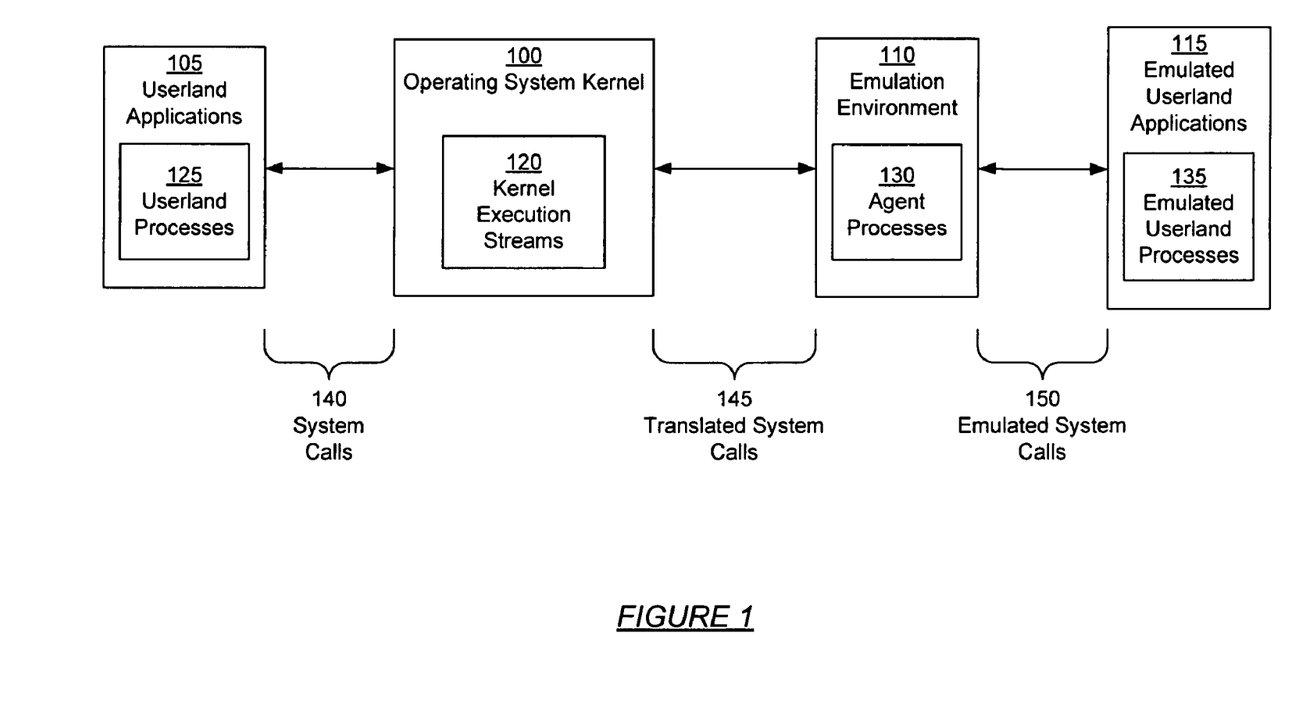
FIGS. 1-3 show schematic diagrams in accordance with one or more embodiments of the invention.

FIG. 1 shows a schematic diagram of a system in accordance with one or more embodiments of the invention. As shown in FIG. 1, the system includes an operating system kernel (100), a set of userland applications (105), an emulation environment (110), and a set of emulated userland applications (115). System calls (140) are used between the userland applications (105) and the kernel (100), translated system calls (145) are used between the emulation environment (110) and the kernel, and emulated system calls (150) are used between the emulated userland applications (15) and the emulation environment (110). Each of these components is described in detail below.

The operating system kernel (100) is a central component of a computer's operating system (OS). The OS kernel (100) manages the computer's resources and the communication between the computer's hardware and software components. The OS kernel (100) also provides the lowest layer of abstraction for the resources, such as memory, processors, and input/output (I/O) devices, used by applications (e.g., userland applications (105), emulated userland applications (115)) running on the OS. The OS kernel (100) typically provides these resources to applications (e.g., userland applications (105), emulated userland applications (115)) using system calls (140). The OS kernel (100) may also provide methods for synchronization and communication between processes (e.g., userland processes (125), agent processes (130), emulated userland processes (135)) using, for example, inter-process communication (IPC) mechanisms. The OS kernel (100) also executes and provides support for applications (e.g., userland applications (105), emulated userland applications (115)) on the computer. In addition, the OS kernel (100) may manage a set of peripheral devices (not shown), such as printers, scanners, mice, external storage devices, and other devices that are optional to the normal operation of the computer.

In one or more embodiments of the invention, the OS kernel (100) uses one or more kernel execution streams (120) to carry out its responsibilities. In one or more embodiments of the invention, a kernel execution stream (120) is a sequence of instructions executed by a processor, such as a central processing unit (CPU), on the computer. In one or more embodiments of the invention, a kernel execution stream (120) is analogous to a thread. A kernel execution stream (120) may be associated with one or more processes (e.g., userland processes (125), agent processes (130), emulated userland processes (135)). In other words, a kernel execution stream (120) may execute instructions related to one or more processes (e.g., userland processes (125), agent processes (130), emulated userland processes (135)) on the computer. Alternatively, multiple kernel execution streams (120) may be associated with a single process (e.g., userland processes (125), agent processes (130), emulated userland processes (135)). For example, in a multitasking environment, a process (e.g., userland processes (125), agent processes (130), emulated userland processes (135)) may employ multiple concurrent kernel execution streams (120) to carry out one or more tasks for which the process is responsible.

In one or more embodiments of the invention, userland applications (105) allow tasks to be performed on the computer by one or more users. Examples of userland applications (105) include word processors, spreadsheets, media players, web browsers, and other utilities. In one or more embodiments of the invention, the userland applications (105) are external to the OS kernel (100). In addition, the userland applications (105) must interact with the OS kernel (100) to use the resources (e.g., memory, processors, I/O) on the computer for executing tasks specified by the user. For example, a web browser must display one or more web pages to a user and respond to input provided by the user through a keyboard, mouse, and/or other I/O device. The OS kernel (100) provides memory required to run the web browser, as well as store content from the web. The OS kernel (100) also regulates the web browser's access to I/O devices. The OS kernel (100) further decides when the web browser is allowed to run on one or more processors in the computer.

As shown in FIG. 1, the userland applications (105) are associated with a set of userland processes (125). In one or more embodiments of the invention, a userland process (125) is a running instance of a userland application (105). In one or more embodiments of the invention, an instance of a userland application (105) is started as a userland process (125). The userland process (125) may then spawn one or more child processes, which are also userland processes (125). In one or more embodiments of the invention, a userland process (125) may be associated with an image of the executable code of the affiliated userland application (105); a region of memory that includes the executable code and other process-specific data; OS descriptors of resources allocated to the process, such as file descriptors or handles; security attributes, such as the process owner and permissions set for the process; and a process state, such as "created", "terminated", "running", "blocked", "waiting", etc.

In one or more embodiments of the invention, a userland application (105) uses one or more system calls (140) to request service from the OS kernel (100). In one or more embodiments of the invention, a system call (140) from a userland application (105) transfers control to the OS kernel (100). The OS kernel (100) then executes code related to the system call (140) before transferring control back to the userland application (105). Examples of system calls (140) include open, read, write, close, wait, exec, fork, and kill.

Those skilled in the art will appreciate that different OSes may contain different system calls (140). Further, those skilled in the art will appreciate that the same system call (140) may behave differently based on the OS installed on the computer. As a result, the userland applications (105) may use different system calls (140) to interact with the OS kernel (100) depending on the OS kernel (100) and/or the OS in general.

The system of FIG. 1 also includes an emulation environment (110). In one or more embodiments of the invention, an emulation environment (110) allows the behavior of a second OS to be emulated on the OS kernel (100). For example, the OS kernel (100) may be Solaris-based (e.g., Solaris 10), but a user may wish to run one or more Linux programs on the OS kernel (100). To do so, a Linux emulation environment (110) may be installed on the computer, allowing Linux programs to run on the computer. In one or more embodiments of the invention, the emulation environment (110) allows the computer to provide routines (e.g., Linux routines) that are not normally associated with the OS kernel (100). In other words, the emulation environment (110) resolves compatibility issues between the OS of the OS kernel (100) and the OS emulated by the emulation environment (110).

Together, the OS kernel (100) and emulation environment (110) allow a user to run a set of emulated userland applications (115) on the computer. In one or more embodiments of the invention, emulated userland applications (115) are applications that are native to an OS other than the OS kernel's (100) OS. In one or more embodiments of the invention, the emulated userland applications (115) interact with the emulation environment (110) as if the emulation environment (110) were an OS kernel (100) of the OS emulated by the emulation environment (110). In one or more embodiments of the invention, the emulation environment (110) is indistinguishable from an OS kernel (100) to the emulated userland applications (115). Using the example above, a user may run one or more Linux applications (i.e., emulated userland applications (115)) on a Solaris kernel by running the applications through a Linux emulation environment. The Linux emulation environment translates any Linux-based routines found in the Linux applications into Solaris-based routines that can be comprehended by the Solaris kernel.

As with the userland applications (105) and userland processes (125), the emulated userland applications (115) are associated with a set of emulated userland processes (135). Like userland processes (125), the emulated userland processes (135) are running instances of emulated userland applications (115). In one or more embodiments of the invention, an emulated userland process (135) may also be associated with an image of the executable code of the affiliated emulated userland application (115), a region of memory, OS descriptors of resources allocated to the process, security attributes, and a process state. In one or more embodiments of the invention, an emulated userland process (135) corresponds to a running instance of an emulated userland application (115) or a child process of the running instance.

In one or more embodiments of the invention, the emulated userland applications (115) interact with the emulation environment (110) using a set of emulated system calls (150). In one or more embodiments of the invention, emulated system calls (150) are system calls of the OS emulated by the emulation environment (110). For example, if the OS emulated by the emulation environment (110) includes a "wait" system call, and an emulated userland application (115) uses the "wait" system call in a routine, the emulation environment (110) intercepts the "wait" system call from the emulated userland application (115) and processes the system call according to the emulated OS's use of the system call. The emulation environment (110) then interacts with the OS kernel (100) using one or more translated system calls (145) to carry out the function of the emulated system call (150).

In one or more embodiments of the invention, translated system calls (145) are used by the emulation environment (110) to perform the same function as the emulated system calls (150) made by an emulated userland application (115). In other words, the emulation environment (110) performs a mapping from the emulated system calls (150) to system calls (140) that exist for the OS kernel (100). The emulation environment (110) may also perform additional processing and packaging so that the behavior of the emulated system calls (150) is adequately simulated. For example, an emulated system call (150) of the emulation environment (110) may be simulated using three system calls (140) from the OS kernel (100), as well as additional configuration of emulated userland processes (135) and associated data. In such cases, the emulation environment (110) makes the three system calls (140) and performs the necessary configurations when the emulated system call (150) is made by an emulated userland application (115). Further, the emulated userland application (115) then receives any output related to the emulated system call (150) as if the emulated system call (150) were made on the native OS of the emulation environment (110).

Those skilled in the art will appreciate that the mapping may be arbitrarily complex, depending on the overlap of system call (140) functionalities between the OS emulated in the emulation environment (110) and the OS of the OS kernel (100). For example, if the OS kernel (100) includes a system call (140) that performs the same function as an emulated system call (150) made by an emulated userland application (115), then an invocation of the emulated system call (150) by the emulated userland application (115) is handled by calling the functionally equivalent system call (140) (i.e., translated system call (145)) by the emulation environment (110). In one or more embodiments of the invention, functional equivalents between emulated system calls (150) and system calls (140) may be stored in a table, map, pointer array, etc. for fast lookup. However, if no functional equivalent exists between an emulated system call (150) and a system call (140), the emulation environment (110) provides one or more routines for performing the steps of the emulated system call (150) using the kernel's (100) existing system calls (140) and any additional code for formatting data, assigning ownership to emulated userland processes (135), etc.

In one or more embodiments of the invention, translated system calls (145) form part of the routines provided by the emulation environment (110) for performing emulated system calls (150). In one or more embodiments of the invention, translated system calls (145) correspond to system calls (140) of the OS kernel (100) invoked by the emulation environment (110) to help carry out the functionality of emulated system calls (150). As mentioned above, the emulation environment (110) may also format data, change security settings and privileges, configure parent-child relationships among emulated userland processes (135), and perform other tasks related to emulating an emulated system call (150) in the OS kernel's (100) environment.

Embodiments of the invention provide the ability to handle a functionally equivalent mechanism that exists between a system call (140) of the OS kernel (100) and an emulated system call (150) of the emulation environment (110). However, the emulated system call (150) allows the mechanism to be implemented between any two processes (e.g., userland processes (125), agent processes (130), emulated userland processes (135)), whereas the system call (140) only allows the mechanism to be carried out within a parent-child process relationship. For example, a Linux ptrace system call allows one process (e.g., userland processes (125), agent processes (130), emulated userland processes (135)) to trace another process, regardless of the relationship between the two processes. However, a Solaris ptrace system call only allows a process (e.g., userland processes (125), agent processes (130), emulated userland processes (135)) to trace another process if the traced process is a child of the tracing process. Consequently, embodiments of the invention enable a Linux emulation environment to execute on a computer with a Solaris kernel. Further, embodiments of the invention enable the emulation of a Linux ptrace system call (i.e., emulated system call) using the system calls available on the Solaris kernel.

In one or more embodiments of the invention, the emulation environment (110) emulates a mechanism that can be implemented between any two processes (e.g., userland processes (125), agent processes (130), emulated userland processes (135)) in the emulated OS in an OS kernel (100) that only supports the mechanism between a parent process and a child process. In one or more embodiments of the invention, the emulation environment (110) spawns an agent process (130) as a child of the first emulated userland process (135). The agent process (130) then implements the functionality of the mechanism with the second emulated userland process (135) using a general mechanism supported by the OS kernel (100). The agent process (130) then reports back to the parent emulated userland process (135) using a parent-child mechanism supported by the OS kernel (100).

In one or more embodiments of the invention, an agent process (130) is a child process of an emulated userland process (135) that is spawned specifically to implement an emulated system call (150) between any two emulated userland processes (135) when the functionally equivalent system call (140) in the OS kernel (100) is only allowed between a parent process (e.g., userland processes (125), agent processes (130), emulated userland processes (135)) and a child process. As stated above, the agent process (130) uses a general mechanism supported by the OS kernel (100) to implement the emulated system call (150) between the two emulated userland processes (135). In other words, the agent process (130) acts as an intermediary between the two emulated userland processes (135) and carries out the functionality of the emulated system call (150) between the two emulated userland processes (135). The agent process (130) also passes any data and instructions between the two emulated userland processes (135) that would normally be directly exchanged between the two emulated userland processes (135) using mechanisms that both emulated userland processes (135) would expect.

For example, a Linux ptrace system call between an arbitrary tracing process and an arbitrary traced process may be emulated in a Solaris kernel by spawning an agent process (130) that is a child of the tracing process. The agent process (130) then traces the traced process using a general mechanism supported by the Solaris kernel (100), such as /proc, which is a pseudo-file system used to obtain process data from the OS kernel (100). Traced data and process state are then passed back to the tracing process using a parent-child mechanism, such as a wait system call (140). In one or more embodiments of the invention, the parent-child mechanism used between the agent process (130) and tracing process is the same as the parent-child mechanism used between the traced process and the tracing process in a native Linux environment. As a result, neither the user calling ptrace from the emulated Linux environment (110) nor the tracing process are aware of the details of the ptrace emulation mechanism.

Those skilled in the art will appreciate that two functionally equivalent mechanisms, such as a ptrace system call and /proc, operate using different application programming interfaces (APIs). Thus, to shield the user and emulated userland process (135) created to carry out the emulated system call (150) from knowledge of a different API for implementing the emulated system call's (150) functionality, an agent process (130) is created. The agent process then uses the different API to perform the emulated system call's (150) function, then uses the API of the emulated system call (150) on the native OS of the emulation environment (110) to communicate the results of the emulated system call (150) to the emulated userland process (135) associated with the execution of the emulated system call (150).

Figure 2:
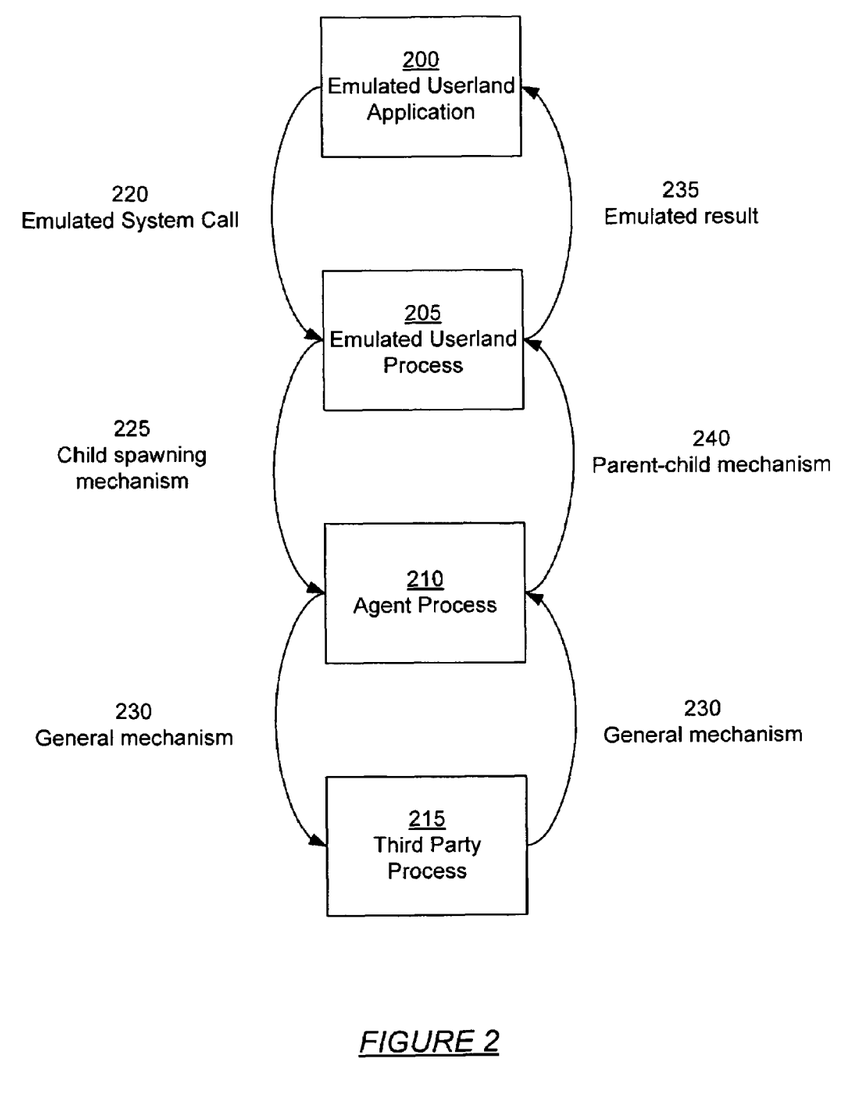

FIG. 2 shows a schematic diagram of a general process relationship in accordance with one or more embodiments of the invention. FIG. 2 includes an emulated userland application (200), an emulated userland process (205), an agent process (210), and a third party process (215). In one or more embodiments of the invention, the components of FIG. 2 are used to emulate a system call between two arbitrary processes in a first OS emulated in a second OS, where the emulated first OS supports the system call between any two processes but the second OS only supports the system call between a parent process and a child process.

As shown in FIG. 2, an emulated userland process (205) is created from an emulated userland application (200) using an emulated system call (220). In one or more embodiments of the invention, the emulated userland application (200) refers to a running instance of the emulated userland application (200) with which the user interacts. As discussed in FIG. 1, an emulated system call (220) is a system call native to the emulated first OS. The functionality of the emulated system call (220) is reproduced in the second OS through system calls supported by the second OS and/or customized routines in the emulation environment of the first OS. In one or more embodiments of the invention, an emulated userland process (205) is created using a system call in the native OS of the computer when an emulated system call (220) is made from within an emulated userland application (200). In one or more embodiments of the invention, the emulated userland process (205) is created to carry out the emulated system call (220). In one or more embodiments of the invention, the emulated system call (220) involves interacting with a third party process (215) using the emulated userland process (205).

For example, an exec system call may be used to create the emulated userland process (205) when the emulated system call (220) is made from the emulated userland application (200). The emulated system call (220) may be issued to the emulation environment of the first OS, which may then make the same system call or a similar system call to the kernel of the second OS to create the emulated userland process (205). Alternatively, the emulation environment may use an entirely different system call to the kernel of the second OS to create the emulated userland process (205). Those skilled in the art will appreciate that different system calls and emulated system calls may be used depending on the emulation environment of the first OS and the native second OS.

In one or more embodiments of the invention, the emulated userland process (205) is configured to interact with a third-party process (215) through the emulated system call (220). However, the kernel of the second OS does not support the emulated system call (220) directly between the emulated userland process (205) and an arbitrary third-party process (215), which may be any other process on the computer. Instead, the kernel of the native second OS only supports the system call between the emulated userland process (205) and a child process of the emulated userland process.

To emulate the functionality of the system call in the emulated first OS, the emulation environment creates an agent process (210) from the emulated userland process (205) using a child-spawning mechanism (225). In one or more embodiments of the invention, an agent process (210) is a child process of the emulated userland process (205) that acts as an intermediary between the emulated userland process (205) and the third-party process (215). In other words, the agent process (210) implements the functionality of the system call in the emulated first OS between the emulated userland process (205) and the third-party process (215) using mechanisms supported by the native second OS. The agent process (210) also hides the emulation mechanism of the emulated system call (220) from the emulated userland process (205), emulated userland application (200), and user.

In one or more embodiments of the invention, the agent process (210) is created from the emulated userland process (205) using a child-spawning mechanism (225). In one or more embodiments of the invention, a child-spawning mechanism (225) creates a child process from a parent process. In one or more embodiments of the invention, the agent process (210) is created as a child of the emulated userland process (205) and inherits at least one of its attributes from the emulated userland process (205). In one or more embodiments of the invention, the agent process (210) is created from the emulated userland process (205) using a system call, such as the fork system call in Unix-like OSes.

The agent process (210) interacts with the third-party process (215) using a general mechanism (230). In one or more embodiments of the invention, the general mechanism (230) is used by the agent process (210) to implement the functionality of the emulated system call between the emulated userland process (205) and the third-party process (215). In one or more embodiments of the invention, the general mechanism (230) is a routine, program, process, system call, etc. that operates using a different API from the emulated system call (220) but performs the same function as the emulated system call (220). Using the general mechanism (230), the agent process (210) can bypass the parent-child restriction on the emulated system call (220) from within the native second OS to emulate the broader application of the emulated system call (220) specified by the emulated first OS.

In one or more embodiments of the invention, the agent process (210) obtains an emulated result (235) related to the emulated system call (220) using the general mechanism (230). The agent process (210) then sends the emulated result (235) to the emulated userland process (205) using a parent-child mechanism (240). In one or more embodiments of the invention, the parent-child mechanism (240) is the same as the parent-child mechanism used between a parent process and a child process in invoking the emulated system call (220) in the native first OS. As a result, the emulated userland process (205) is unable to detect a difference in behavior between making the emulated system call (220) in an emulated environment and making the emulated system call (220) in an OS that inherently supports the emulated system call (220) between two arbitrary processes.

In one or more embodiments of the invention, the emulated userland process (205) transfers the emulated result (235) to the emulated userland application (200), where the emulated result (235) is displayed to the user and/or stored for further processing. In one or more embodiments of the invention, the emulated result (235) is formatted as if the emulated result (235) were obtained in a native environment of the second OS, as opposed to an emulated environment of the second OS.

Figure 3:
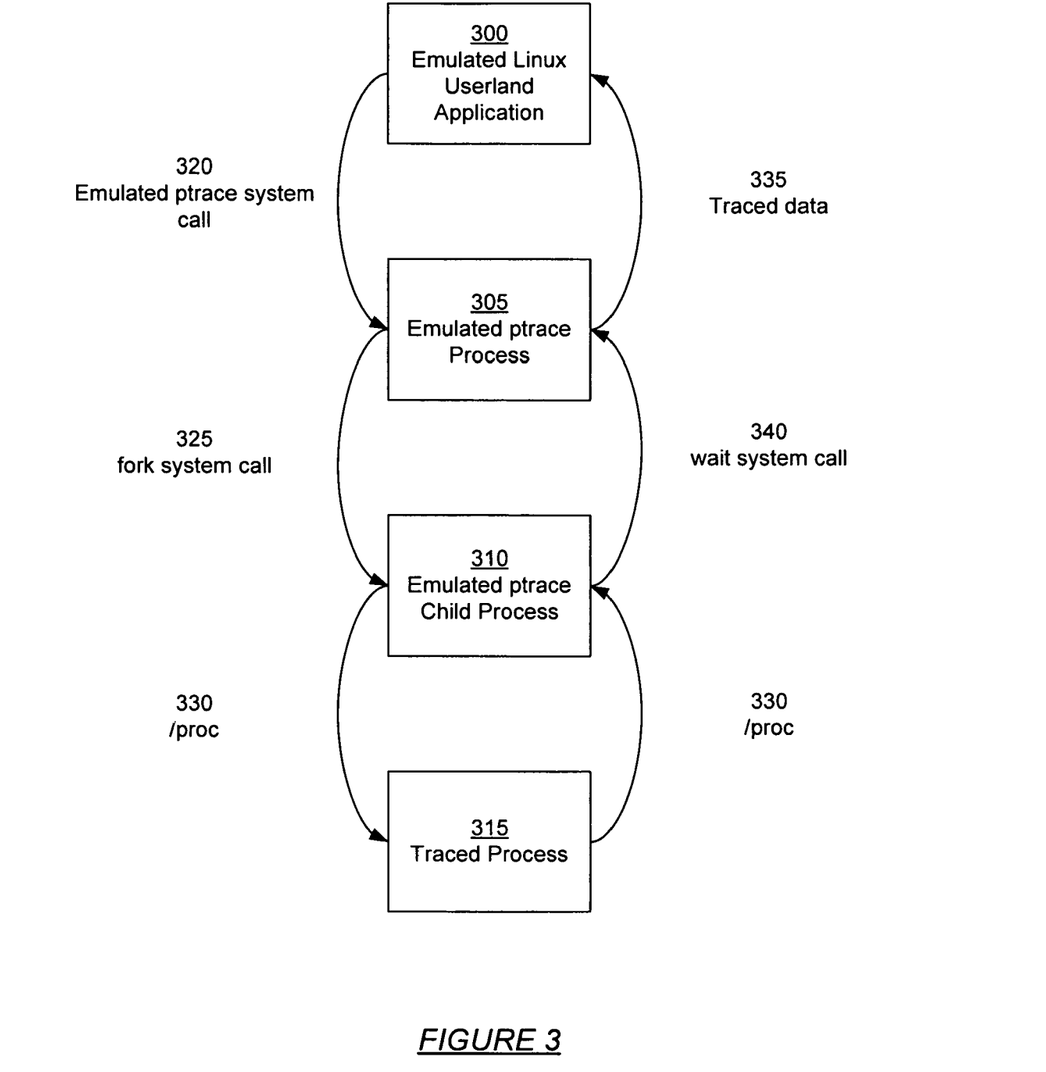

FIG. 3 shows a schematic diagram of a specific process relationship in accordance with one or more embodiments of the invention. In particular, FIG. 3 relates to the emulation of a Linux ptrace system call in a Linux emulation environment installed on a machine with a Solaris-based kernel. As described above, the Linux ptrace system call may be invoked between any two processes, whereas the Solaris ptrace system call may only be invoked between a parent process and a child process. The components of FIG. 3, which include an emulated Linux userland application (300), an emulated ptrace process (305), an emulated ptrace child process (310), and a traced process (315), allow a Linux ptrace system call between the emulated ptrace process (305) and the traced process (315) to be emulated in a Solaris-based kernel.

The emulated Linux userland application (300) refers to an application native to Linux that includes functionality to invoke the ptrace system call. For example, the emulated Linux userland application (300) may be an emulated Linux command console, a debugging application, etc. An emulated ptrace process (305) is created from the emulated Linux userland application (300) when an emulated ptrace system call (320) is invoked from the emulated Linux userland application (300) to trace a traced process (315). In one or more embodiments of the invention, the emulated ptrace system call (320) corresponds to a Linux ptrace system call (320). As mentioned previously, the Linux ptrace system call (320) allows a process to trace any other process, regardless of an existing parent-child relationship between the traced process (315) and tracing process (i.e., the emulated ptrace process (305)). In one or more embodiments of the invention, the traced process (315) is a process within the Linux emulation environment that is targeted for tracing. For example, the traced process (315) may be a process that is being monitored for debugging purposes.

To emulate the Linux ptrace system call (320), the emulated ptrace process (305) creates an emulated ptrace child process (310) using the fork system call (325). In one or more embodiments of the invention, the fork system call (325) creates the emulated ptrace child process (310) as a copy of the emulated ptrace process (305), and also as a child of the emulated ptrace process (305). The emulated ptrace child process (310) may also inherit its attributes from the emulated ptrace process (305). As mentioned above, the emulated ptrace child process (310) carries out the functionality of the emulated ptrace system call (320) between the emulated ptrace process (305) and the traced process (315).

As shown in FIG. 3, the emulated ptrace child process (310) uses /proc (330) to interact with and trace the traced process (315). In one or more embodiments of the invention, /proc (330) is a pseudo-file system used to access information from the kernel. In one or more embodiments of the invention, /proc (330) allows a process to trace any other process within Solaris regardless of any existing parent-child relationships. Those skilled in the art will appreciate that another general tracing mechanism may be used by the emulated ptrace child process (310) to trace the traced process (315).

In one or more embodiments of the invention, traced data (335) from the traced process (315) is obtained by the emulated ptrace child process (310) using /proc (330). The emulated ptrace child process (310) then passes the traced data (335) to the emulated ptrace process (305) using the wait system call (340). In one or more embodiments of the invention, the wait system call (340) is used by a parent process to collect information about a child process after the child process has ended execution. In one or more embodiments of the invention, a wait system call (340) is used by Linux ptrace to obtain information about a traced process (315). Because the same wait system call (340) is used to pass information about the traced process (315) to the emulated ptrace process (305), the emulated ptrace process (305) is unable to distinguish the emulated ptrace system call (320) from a ptrace system call executed in a Linux environment, even though ptrace and /proc use different interfaces.

The emulated ptrace process (305) may then pass the traced data (335) to the emulated Linux userland application (300), where the traced data (335) may be displayed to a user and/or stored for analysis and, potentially, further processing. In one or more embodiments of the invention, the traced data (335) is formatted as if the traced data (335) were obtained in a native Linux environment, as opposed to an emulated Linux environment.

Figure 4:
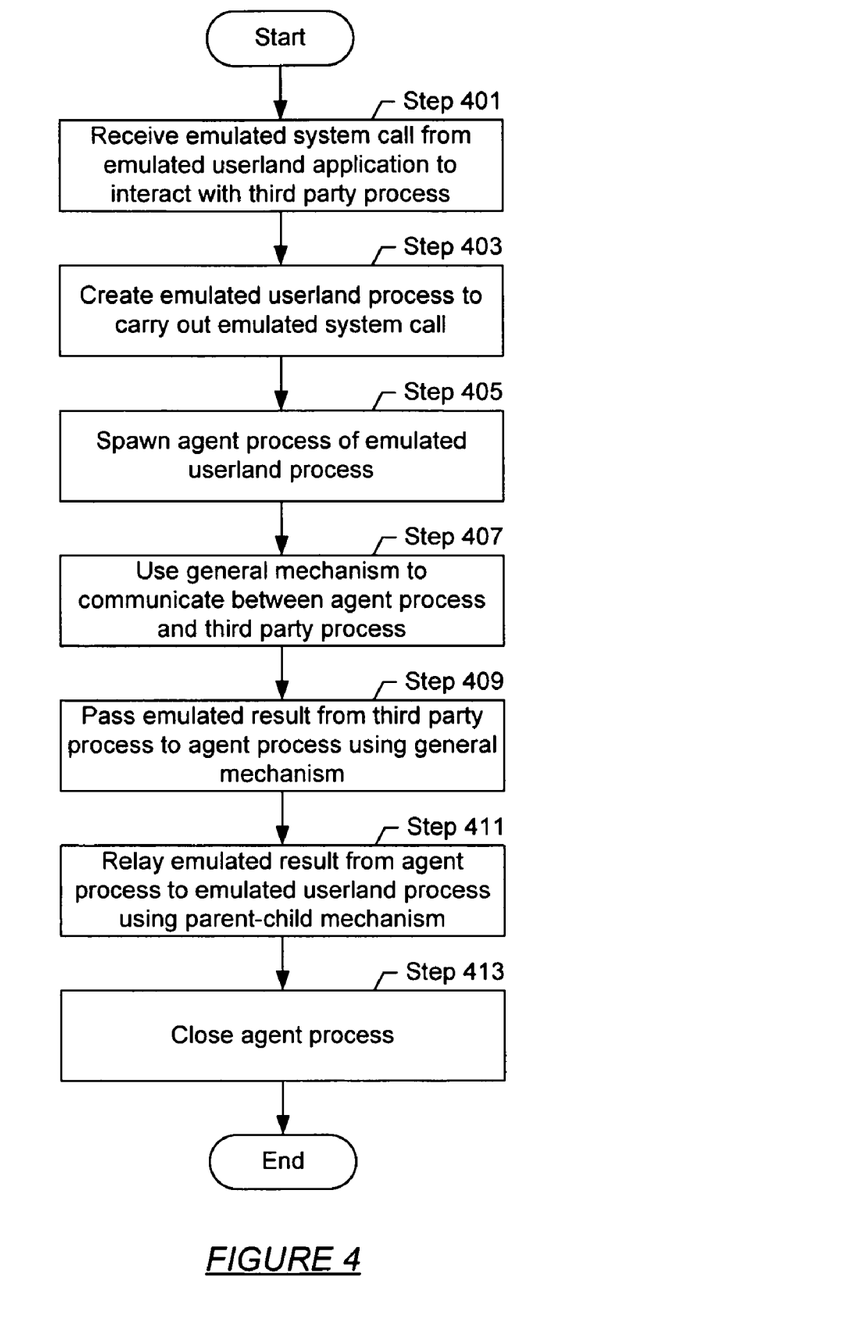
FIGS. 4-5 show flow diagrams in accordance with one or more embodiments of the invention.

FIG. 4 shows a flow diagram of a general system call emulation in accordance with one or more embodiments of the invention. More specifically, FIG. 4 depicts the emulation of a system call in an emulation environment of a first OS that supports the system call between any two arbitrary processes, but where the kernel of the native second OS only supports the system call between a parent process and a child process. Initially, the emulated system call is received by an emulated userland application to interact with a third party process (Step 401). As mentioned previously, the emulated userland application resides in the emulation environment of the first OS, which is installed on a computer running the second OS and which is a different OS from the emulated first OS. In one or more embodiments of the invention, the emulation environment resolves compatibility issues between the emulated first OS the emulated userland application was intended for, and the native second OS running on the computer.

An emulated userland process is created to carry out the emulated system call (Step 403). As mentioned previously, the emulated userland process is created when the emulated system call is made by the emulated userland application. The emulated userland process may be made using a system call in the native second OS, such as exec. The emulated userland process also spawns a child agent process (Step 405), using a fork system call, for example. The agent process then carries out the functionality of the emulated system call by acting as an intermediary between the emulated userland process and the third party process.

In one or more embodiments of the invention, the agent process uses a general mechanism for communicating with the third party process (Step 407). In one or more embodiments of the invention, the general mechanism performs the same function as the emulated system call using a different API. In one or more embodiments of the invention, the agent process is created to hide the use of the different API from the emulated userland process. The general mechanism is also used to pass an emulated result from the third party process to the agent process (Step 409). The agent process relays the emulated result to the emulated userland process using a parent-child mechanism (Step 411), and the agent process is closed (Step 413). In one or more embodiments of the invention, the parent-child mechanism is the same parent-child mechanism used between two processes in a native environment of the emulated first OS to carry out the emulated system call. As described above, the emulated result may be formatted to match a result obtained through normal operation of the emulated system call in the emulated first OS.

Figure 5:
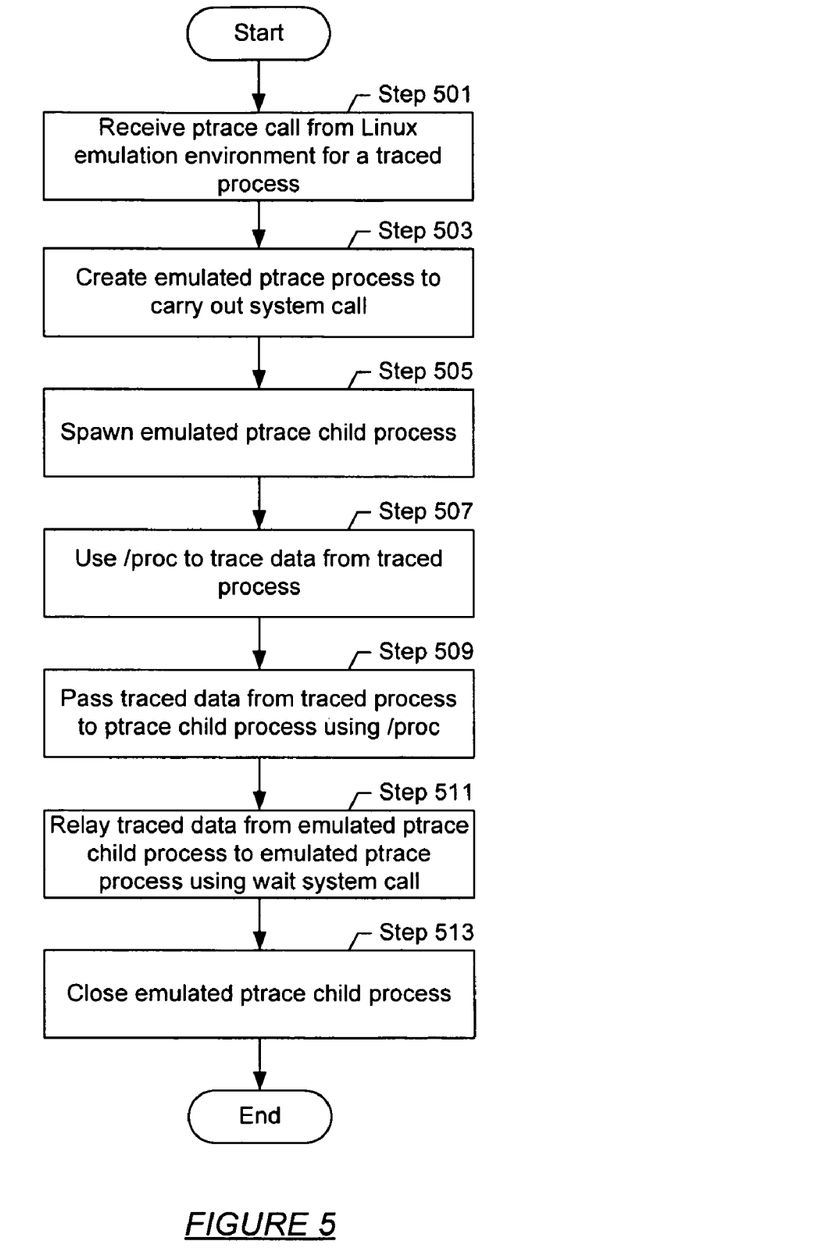

FIG. 5 shows a flow diagram of a specific system call emulation in accordance with one or more embodiments of the invention. More specifically, FIG. 5 shows a flow diagram of a Linux ptrace system call emulation in a native Solaris environment. In one or more embodiments of the invention, the Linux ptrace system call is emulated using a Linux emulation environment that interacts with the Solaris kernel. As described above, Linux supports ptrace between any two processes, but Solaris supports ptrace only between a parent process and a child process. As a result, when ptrace is invoked between two arbitrary processes in the Linux emulation environment, the emulation environment must emulate the Linux-based ptrace using mechanisms that are supported by the Solaris kernel. FIG. 5 depicts how the Linux-based ptrace emulation is carried out.

Initially, the ptrace system call is received from the Linux emulation environment to trace a traced process (Step 501). The ptrace system call may be made from a command line, a graphical user interface (GUI), a shell script, a scheduled task, etc. An emulated ptrace process is also created to carry out the Linux ptrace system call (Step 503). In one or more embodiments of the invention, the emulated ptrace process is spawned by the Linux emulation environment using a system call to the Solaris kernel.

A ptrace child process is spawned from the emulated ptrace process (Step 505). In one or more embodiments of the invention, the ptrace child process is spawned using the fork system call, which creates a copy of the emulated ptrace process as a child of the emulated ptrace process. The ptrace child process may also inherit some or all of its attributes from the emulated ptrace process. The ptrace child process uses the /proc utility to trace data from the traced process (Step 507). As mentioned above, /proc is a pseudo-file system used to access process information from the kernel. In one or more embodiments of the invention, /proc allows a process to trace any other process using a different interface from ptrace. Alternatively, the ptrace child process may use another general utility to trace the traced process.

The ptrace child process also uses /proc to obtain traced data from the traced process (Step 509). The ptrace child process relays the traced data to the emulated ptrace process using a wait system call (Step 511). In one or more embodiments of the invention, the wait system call allows a parent process to wait for a child process to die. The parent process may then obtain information about the child process once the child process has ended execution. In one or more embodiments of the invention, the emulated ptrace process uses the wait system call to obtain the traced data from the ptrace child process. In one or more embodiments of the invention, the wait system call is used by a ptrace process in a native Linux environment to obtain information directly from the traced process. As a result, the emulated ptrace process is unable to distinguish the Linux ptrace system call in the Linux emulation environment from a Linux ptrace system call in a native Linux environment. The child process is closed (Step 513) once the traced data is obtained.

Figure 6:
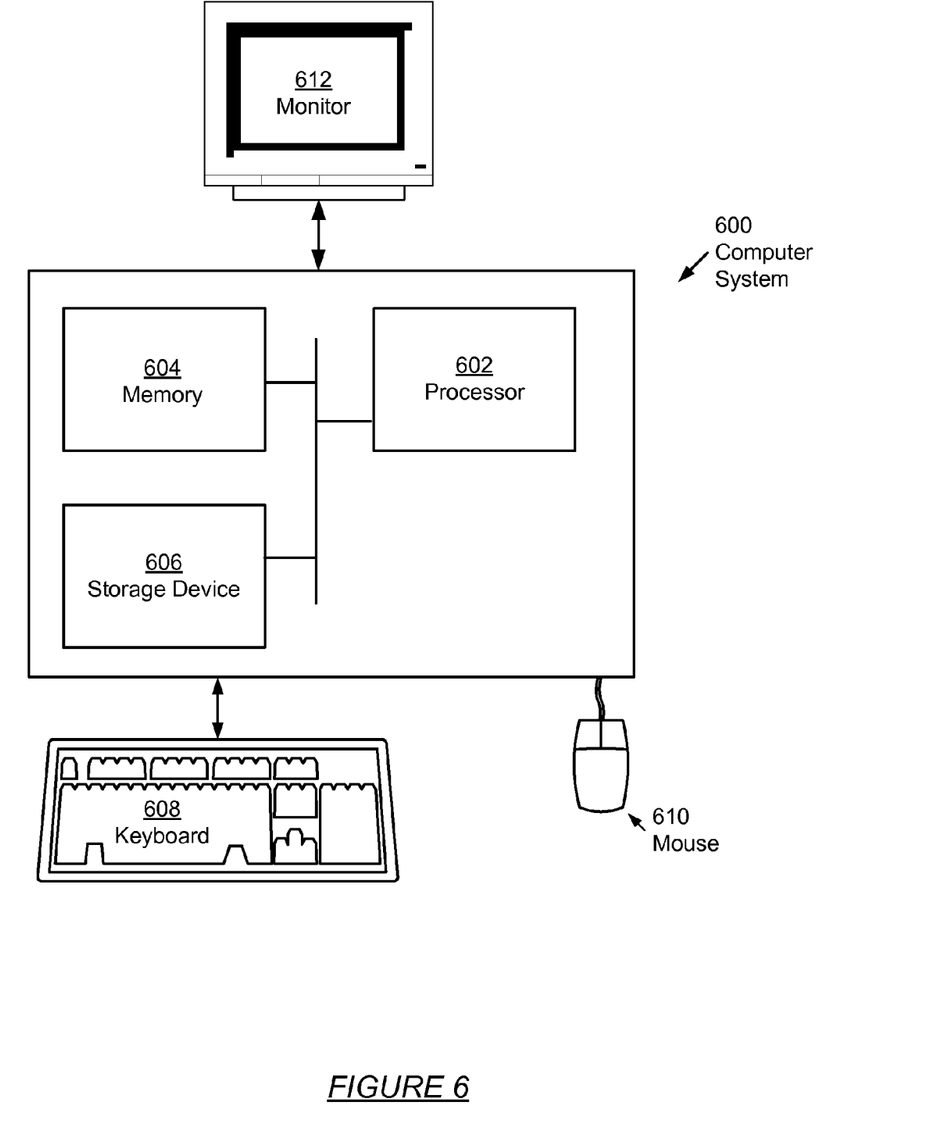
FIG. 6 shows a computer system in accordance with one or more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., first OS, second OS, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for emulating a system call, comprising:

making the system call by a first process in a first operating system (OS) for interacting with a second process,
wherein the first OS is emulated in a second OS,
wherein the second OS requires a parent-child process relationship between the first process and the second process to perform the system call, and
wherein the parent-child process relationship between the first process and the second process is nonexistent in the first OS and in the second OS;

spawning, in response to the system call, an agent process by an emulator to emulate the system call, wherein the agent process is a child process of the first process;

calling, by the agent process, a general mechanism on the second process, wherein the general mechanism implements a functionality of the system call in the second OS;

passing a result from the second process to the agent process using the general mechanism; and relaying the result from the agent process to the first process using a system call in the second OS, wherein the result is stored by the first process.

2. The method of claim 1, wherein the system call in the second OS is a wait system call.

3. The method of claim 1, wherein the system call is a ptrace system call.

4. The method of claim 1, wherein the general mechanism is /proc.

5. A computer system comprising:

a computer processor a first operating system (OS) emulated in a second OS executing on the computer processor; and the second OS configured to execute:

an emulated userland process, wherein the emulated userland process is configured to make a system call in the first OS for interacting with a second process, wherein the second OS requires a parent-child process relationship between the first process and the second process to perform the system call, and wherein the parent-child process relationship between the first process and the second process is nonexistent in the first OS and in the second OS;

an emulation environment for the first OS, wherein the emulation environment for the first OS is configured to:

intercept the system call from the emulated userland process;

spawn, in response to the system call, an agent process to emulate the system call, wherein the agent process is a child process of the emulated userland process;

call, by the agent process, a general mechanism on the second process, wherein the general mechanism implements a functionality of the system call in the second OS pass a result from the second process to the agent process using the general mechanism; and relay the result from the agent process to the emulated userland process using a system call in the second OS.

6. The system of claim 5, wherein the system call in the second OS is a wait system call.

7. The system of claim 5, wherein the system call is a ptrace system call.

8. The system of claim 5, wherein the general mechanism is /proc.

9. A computer readable medium containing software instructions embodied therein for causing a computer system to perform a method for emulating a system call, comprising:

making the system call by a first process in a first operating system (OS) for interacting with a second process, wherein the first OS is emulated in a second OS wherein the second OS requires a parent-child process relationship between the first process and the second process to perform the system call, and wherein the parent-child process relationship between the first process and the second process is nonexistent in the first OS and in the second OS;

spawning, in response to the system call, an agent process by an emulator to emulate the system call, wherein the agent process is a child process of the first process;

calling, by the agent process, a general mechanism on the second process, wherein the general mechanism implements a functionality of the system call in the second OS;

passing a result from the second process to the agent process using the general mechanism; and relaying the result from the agent process to the first process using a system call in the second OS, wherein the result is stored by the first process.

10. The computer readable medium of claim 9, wherein the system call in the second OS is a wait system call.

11. The computer readable medium of claim 9, wherein the system call is a ptrace system call.

12. The computer readable medium of claim 9, wherein the general mechanism is /proc.

* * * * *

UNITED STATES PATENT AND TRADEMARK OFFICE
CERTIFICATE OF CORRECTION

| | | |
|---|---|---|
| PATENT NO. | : 7,720,671 B2 | Page 1 of 1 |
| APPLICATION NO. | : 11/606748 | |
| DATED | : May 18, 2010 | |
| INVENTOR(S) | : Adam H. Leventhal et al. | |

It is certified that error appears in the above-identified patent and that said Letters Patent is hereby corrected as shown below:

In column 3, line 7, delete "(15)" and insert -- (115) --, therefor.

In column 13, line 17, in claim 5, delete "processor" and insert -- processor; --, therefor.

In column 13, line 42, in claim 5, delete "OS" and insert -- OS; --, therefor.

In column 14, line 16, in claim 9, delete "OS" and insert -- OS, --, therefor. (second occurrence)

Signed and Sealed this
Fourteenth Day of June, 2011

David J. Kappos
*Director of the United States Patent and Trademark Office*